(12) United States Patent
Monahan et al.

(10) Patent No.: US 6,478,435 B2
(45) Date of Patent: Nov. 12, 2002

(54) SECURING OBJECTS TO CAR SEATS

(75) Inventors: Robert D. Monahan, Canton, MA (US); Rene Polin, Jr., Lakewood, OH (US)

(73) Assignee: The First Years Inc., DE (US)

(*) Notice: Subject to any disclaimer, the term of this patent is extended or adjusted under 35 U.S.C. 154(b) by 0 days.

(21) Appl. No.: 10/059,571

(22) Filed: Jan. 29, 2002

(65) Prior Publication Data

US 2002/0080505 A1 Jun. 27, 2002

Related U.S. Application Data

(63) Continuation of application No. 09/358,154, filed on Jul. 20, 1999, now Pat. No. 6,354,708.

(51) Int. Cl.[7] ............................................... G02B 7/182
(52) U.S. Cl. ........................ 359/872; 359/871; 359/875; 248/476
(58) Field of Search ................................ 359/872, 871, 359/875, 879, 880; 248/475.1, 476, 477, 481, 496, 497, 498

(56) References Cited

U.S. PATENT DOCUMENTS

| | | | |
|---|---|---|---|
| 3,048,084 A | 8/1962 | Iannuzzi | |
| 3,515,365 A | 6/1970 | Jones et al. | |
| 3,954,328 A | 5/1976 | Ames | |
| D247,327 S | 2/1978 | Tracy | |
| 4,381,142 A | 4/1983 | McCoigan | |
| 4,486,075 A | 12/1984 | Cohen | |
| 4,598,982 A | 7/1986 | Levine | |
| 4,623,177 A | * 11/1986 | McKinney | .................. 24/683 |
| 4,702,572 A | 10/1987 | Cossey | |
| 4,703,972 A | 11/1987 | Omberg | |
| 4,712,892 A | 12/1987 | Masucci | |
| 4,718,756 A | 1/1988 | Lancaster | |
| 4,733,956 A | 3/1988 | Erickson | |
| 4,793,701 A | 12/1988 | Brown | |
| 4,832,476 A | 5/1989 | Gabrielyan | |
| 4,863,254 A | 9/1989 | Dyer | |
| 4,902,118 A | 2/1990 | Harris | |
| 4,909,618 A | 3/1990 | Gardner | |
| 4,927,255 A | 5/1990 | Martinez | |
| D312,349 S | 11/1990 | Pogue | |
| D316,649 S | 5/1991 | Swanner | |
| D318,641 S | 7/1991 | Schwartz | |
| 5,044,739 A | 9/1991 | do Espirito Santo | |
| D324,953 S | 3/1992 | Swanner | |
| 5,103,347 A | 4/1992 | Lumbra et al. | |
| 5,285,321 A | 2/1994 | Nolan-Brown | |
| D346,900 S | 5/1994 | Gill | |
| 5,453,882 A | 9/1995 | Westman | |
| 5,576,898 A | 11/1996 | Rubin | |
| 5,668,526 A | 9/1997 | Collins | |
| 5,707,107 A | 1/1998 | Melone | |
| D392,613 S | 3/1998 | Peters | |
| D396,983 S | 8/1998 | Taylor | |
| 6,006,462 A | * 12/1999 | Lackomar | .................... 108/44 |
| 6,007,501 A | * 12/1999 | Cabados et al. | ............ 601/131 |
| 6,030,085 A | * 2/2000 | Leam et al. | ................ 359/871 |

* cited by examiner

Primary Examiner—Mohammad Sikder
(74) Attorney, Agent, or Firm—Fish & Richardson P.C.

(57) ABSTRACT

An apparatus includes a mirror. A body is adapted to couple to and support the mirror in multiple of orientations to allow the mirror to reflect light from and to multiple areas. Multiple tabs are coupled to the body and adapted to interfere with adjacent portions of a car seat, to which the body is mounted, and a rear ledge of a car to inhibit the body from moving relative to the car seat.

19 Claims, 3 Drawing Sheets

SECURING OBJECTS TO CAR SEATS

This application is a continuation (and claims the benefit of priority under 35 USC 120 of U.S. application Ser. No. 09/358,154, filed Jul. 20, 1999, Pat. No. 5,354,708.

BACKGROUND OF THE INVENTION

The invention relates to mirrors and in particular to mirrors mountable in a car for viewing a child in a rear-facing car seat.

Infants are often placed in rear-facing car seats when riding in a car. Indeed, many states have laws requiring infants to be in rear-facing car seats. When in one of these seats, an infant faces the back of the car. It is difficult for a parent in the front seat of the car to see the infant's face and the infant may become bored without anything at which to look.

SUMMARY OF THE INVENTION

In general, in one aspect, the invention features an apparatus including a mirror. A body is adapted to couple to and support the mirror in multiple of orientations to allow the mirror to reflect light from and to multiple areas. Multiple tabs are coupled to the body and adapted to interfere with adjacent portions of a car seat, to which the body is mounted, and a rear ledge of a car to inhibit the body from moving relative to the car seat.

Implementations of the invention may include one or more of the following features. Each of the multiple tabs includes a plate having top and bottom surfaces and a rib protruding from at least one of the surfaces. The plates have first and second ends, the first ends being movably coupled to the body, and the ribs are wedge-shaped, tapering from relatively thick ends to relatively thin ends that are closer to the second ends of the plates than the first ends of the plates. Each tab has multiple of ribs protruding from both of the top and bottom surfaces. The tabs are attached proximate to a top edge of the body.

The mirror is removably mounted to the body.

The body includes a flexible fabric adapted to adjust to a contour of a car seat.

The apparatus can also include multiple flexible straps and a pair of mating connectors each attached to a strap, at least one of the pair of connectors being adjustably attached along a length of the strap to which the at least one connector is attached. The straps are adapted to form a loop around a rear car seat and to be coupled by connecting the mating connectors to secure the body to the rear car seat.

In general, in another aspect, the invention features an apparatus for viewing a child in a rear-facing car seat in a car. The apparatus includes a body adapted to be mounted to an interior portion of a car. A mirror is removably mounted to the body, the mirror being adjustable to multiple orientations to selectively reflect light to and from multiple directions.

Implementations of the invention may include one or more of the following features. The body is adapted to be mounted to a rear car seat. The body includes a flexible, washable fabric.

In general, in another aspect, the invention features an apparatus for viewing a child in a rear-facing car seat in a car. The apparatus includes a body. A mirror is attached to the body and adjustable to multiple orientations for reflecting light to and from multiple directions. Multiple tabs are coupled to the body and adapted to interfere with adjacent portions of a car seat to which the body is mounted to inhibit the body from moving relative car seat. The apparatus also includes multiple flexible straps. A pair of mating connectors are each attached to a strap, at least one of the pair of connectors being adjustably attached along a length of the strap to which the at least one connector is attached. The straps are adapted to form a loop around a rear car seat and to be coupled by connecting the mating connectors to secure the body to the rear car seat.

Implementations of the invention may include one or more of the following features. The body includes a flexible fabric. The body includes a plurality of transparent pockets. The mirror is removably attached to the body.

Embodiments of the invention may provide one or more of the following advantages. A mirror for viewing a child in a rear-facing car seat can be mounted to multiple types of rear car seats. An apparatus mountable to a rear car seat for attaching a mirror can be separated from the mirror and washed.

Other features and advantages of the invention will be apparent from the following drawings, detailed description, and claims.

DESCRIPTION OF PREFERRED EMBODIMENTS

The invention provides an apparatus that can be easily mounted to a variety of types of car seats and that provides a mirror for viewing an infant in a rear-facing car seat. The mirror can be adjusted to different orientations to help see the-infant. Also, visual stimulation can be provided for the infant in several transparent pockets on the apparatus. The visual stimulation can be changed.

Figure 1:
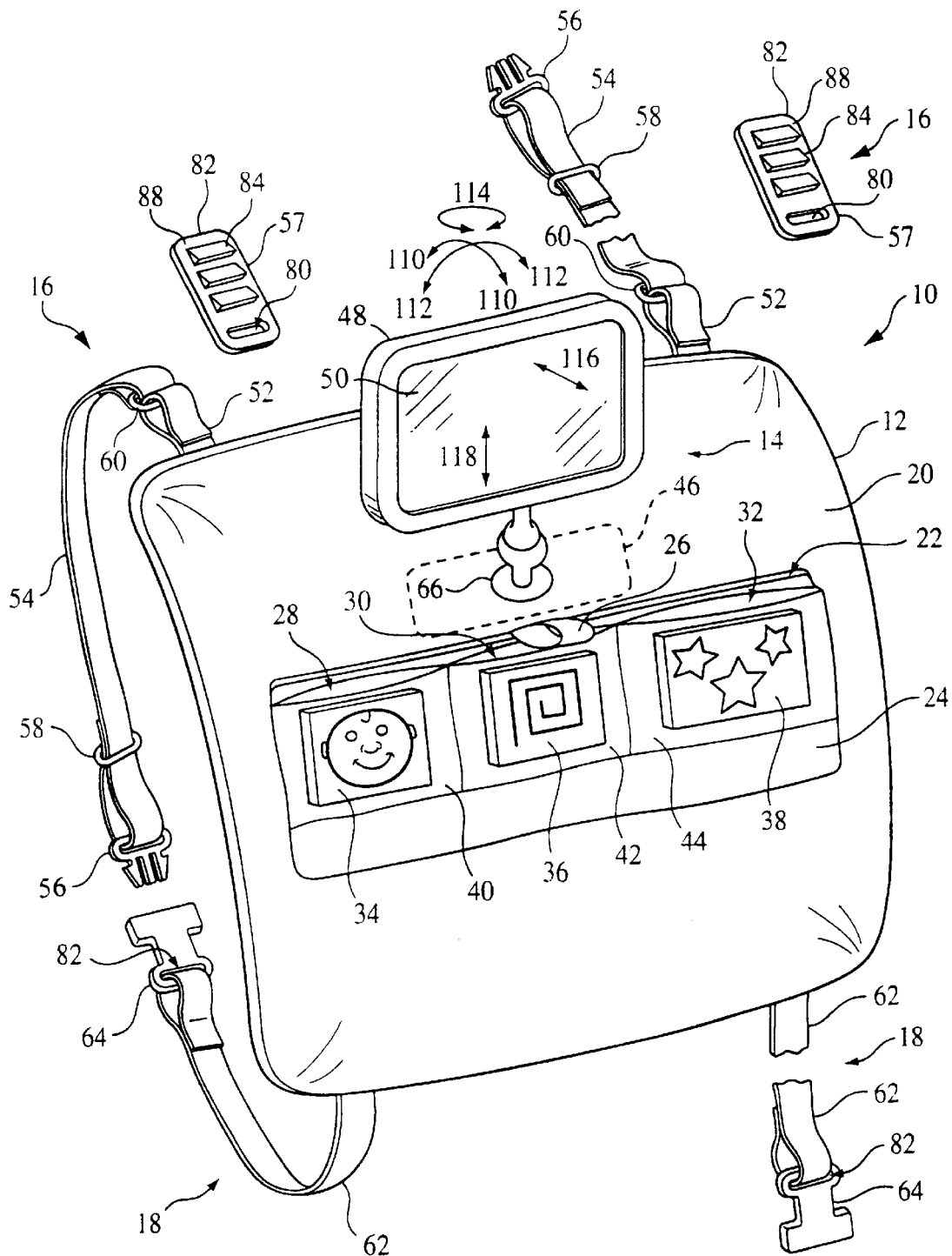
FIG. 1 is a perspective view of an infant-view mirror assembly.

As shown in FIG. 1, an infant-view mirror system 10 includes a body 12, a mirror assembly 14, two male strap assemblies 16, and two female strap assemblies 18. The mirror assembly 14 includes a mirror support 46, a mirror housing 48, and a mirror 50. The mirror support 46 can be made of, e.g., injection molded nylon and the mirror housing 48 made of, e.g., injection molded acrylonitrile butadiene styrene (ABS). The male strap assemblies 16 include an upper strap 52, an adjustable strap 54, a male connector 56, a tab 57, and rings 58 and 60. The female strap assemblies 18 include a lower strap 62 and a female connector 64. The straps 52, 54, and 62 are made of a flexible material, e.g., woven nylon.

The body 12 is adapted to be mounted to a rear car seat. The body 12 is made of flexible, washable materials such as a terry cloth front panel 20 attached to a back panel (not shown) made of, e.g., woven cotton or nylon, with a foam pad (not shown) enclosed by the front and back panels. The body 12 has a substantially rectangular shape.

A storage pouch 22 is provided on the front of the body 12. The pouch 22 is provided by a fabric mesh sheet 24 sewn on three edges to the front panel 20. A fourth edge 26 is not sewn to the front panel 20. The sheet 24 can be selectively coupled to the front panel 20 by connecting mating portions (not shown) of a hook and loop fastener, one portion being attached to the front panel 20 and the mating portion attached to the back of the sheet 24. The sheet 24 can be separated from the panel 20 by pulling on a loop 26 to separate the hook and loop fastener.

On the front of the sheet 24, three pockets 28, 30, and 32 are provided for holding cards 34, 36, and 38 respectively. The pockets 28, 30, and 32 are provided by three transparent sheets 40, 42, and 44 attached to the sheet 24 along three sides each, with a top side of each not being attached to the sheet 24. The cards 34, 36, and 38 can be received within the pockets 28, 30, and 32. Pictures or other graphics on the cards 34, 36, and 38 provide visual stimulation to a child viewing the system 10. The cards can be removed and replaced with cards having different illustrations (or family pictures, *etc.).

The front panel 20 provides a hole 66 through which a the mirror support 46 of the mirror assembly 14 extends. The body 12 retains the mirror support 46 within the body 12 with stitches through the body 12 bordering the mirror support 46.

Figure 2:
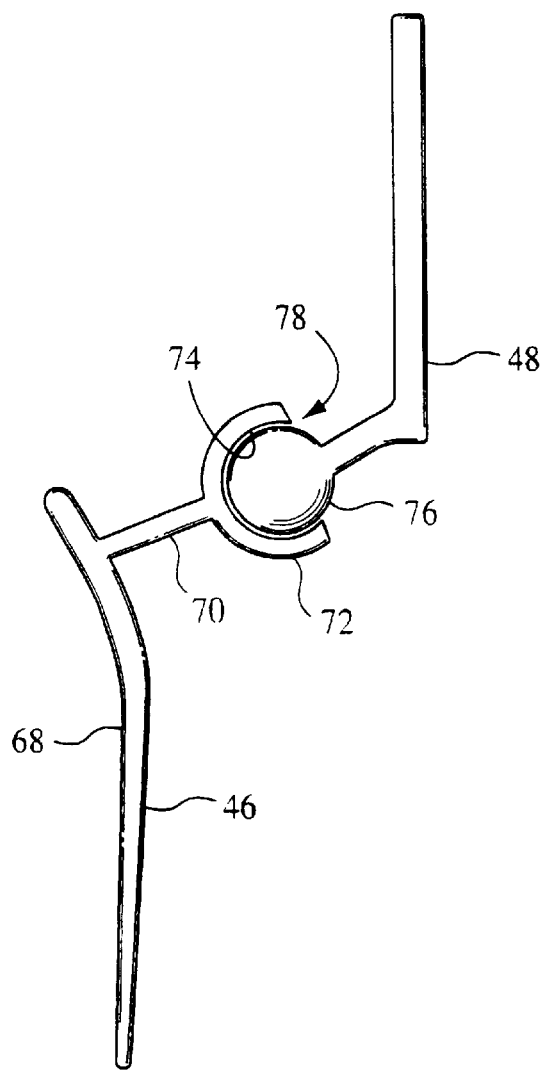
FIG. 2 is a cross-sectional view of a mirror assembly shown in FIG. 1.

Referring to FIG. 2, the mirror support 46 includes a base 68, and an arm 70. The base is received by and retained within the body 12. An upper portion of the base 68 is curved. The arm 70 extends from this upper curved portion through the hole 66 (FIG. 1) in the body 12. The arm 70 includes a partial hemispherical end 72, providing a recess 74 for receiving a ball 76 of the mirror housing 48. The recess 74 has an opening 78 that is slightly smaller than a diameter of the ball 76. The mirror support 46 is made of, e.g., nylon, which allows the end 72 to flex, allowing the opening 78 to widen to accommodate the ball 76 in the recess 74 and to help retain the ball in the recess 74. The recess 74 has a diameter slightly larger than the diameter of the ball 76 to provide frictional engagement between the ball 76 and the recess 74 to help resist movement of the mirror assembly 14.

Referring also to FIG. 1, the mirror assembly 14 is pivotally attached to the mirror support 46, through the ball 76, allowing the mirror housing 48 to be moved. Because, the mirror housing 48 encloses and holds the mirror 50, the ball joint allows the orientation of the mirror 50 to be adjusted. The mirror assembly 14 can be moved by tilting the assembly 14 in the ball 76 in the recess 74 left or right, front or back, or by rotating the ball 76 in the recess 74. When the orientation of the mirror assembly 14 changes, so does the orientation of the mirror 50, and thus the directions from and to which the mirror reflects light.

Referring to FIG. 1, the strap assemblies 16 and 18 are adapted to attach the body 12 to at least two different styles of rear car seats, a free-standing sport-utility style (including e.g., minivans, station wagons, and vans), and a sedan style. The male strap assemblies 16 have two configurations, one adapted to attach the body to a free-standing car seat such as those often found in sport-utility vehicles, and the other adapted to attach the body to a car seat with a ledge directly behind and near the top of the seat.

In the sedan configuration, the male strap assemblies 16 each include the upper strap 52, and the tab 57. The upper strap 52 is attached to the body on one end, e.g., by sewing, and loops through an opening 80 in the tab 57 and attaches to itself by, e.g., having mating hook and loop fasteners (not shown) disposed on the strap 52 in appropriate positions. The length of the loop provided by the strap 52 can be adjusted by selectively positioning the hook and loop fasteners.

Figure 3:
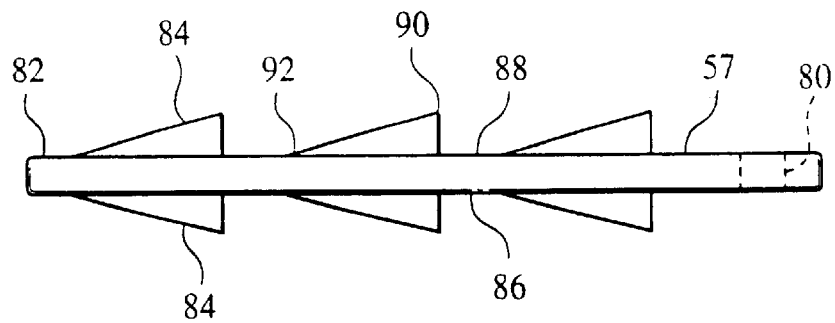
FIG. 3 is a side view of a tab shown in FIG. 1.

Referring also to FIG. 3, the tab 57 includes a plate 82 and several, here six (only three shown in FIG. 1), wedge-shaped ribs 84. The ribs protrude from both a bottom surface 86 (not shown in FIG. 1) and a top surface 88, three ribs 84 protruding from each surface. The ribs 84 taper from a thick end 90 toward a thin end 92. The thick end 90 is closer to the opening 80 in the tab 57.

Referring to FIG. 1, in the sport-utility configuration, the male strap assemblies 16 each include the upper strap 52, the adjustable strap 54, the male connector 56, and the rings 58 and 60. The upper strap 52 is attached to the ring 60 (instead of the tab 57) and can be adjusted as described above. Permanently attached to the ring 60 is the adjustable strap 54. One end of the strap 54 loops through the ring 60 and is sewn to it self. The other end of the strap 54 is free and loops through the male connector 56 and the ring 58. The ring 58 is made of, e.g., rubber to hold the strap 54 in place while permitting adjustment of the strap 54 by pulling the strap through the ring 58 as desired.

The female strap assemblies 18 each have the lower straps 62 attached on one end to the body 12 and on the other to the female connector 64. The strap 62 is attached to the body 12, e.g., by sewing on one end and the other end is looped through an opening 82 in the female connector 64 and is attached to itself, e.g., by sewing. The female connector 64 is adapted to be releasably coupled to the male connector 56. The strap assemblies 16 and 18 are configured such that when the male assembly 16 is in the sport-utility configuration, the assemblies 16 and 18 can be coupled behind a free-standing car seat with the body mounted to the of the seat. For example, the upper strap 52 can be approximately 10.5 inches long, including a 9 inch loop, the adjustable strap 54 can be approximately 23 inches long, and the lower strap 62 can be approximately 13.5 inches long.

The system 10 can be assembled as follows. The sheets 24, 40, 42 and 44 are sewn as shown in FIG. 1. The mirror support arm 70 is inserted through the hole 66 in the front panel 20. The front panel 20 is sewn to the back panel, enclosing the foam pad and the mirror support 46. A border is sewn around the periphery of the base 68 of the mirror support 46. The mirror 50 is enclosed by the mirror housing 48, e.g., by welding two halves of the mirror housing 48 together. The ball 76 of the mirror housing 48 is snapped into the recess 74 of the mirror support 46. One end of each of the straps 52 and 62 is sewn to the body 12. Another end of each of the straps 62 is looped through the connector 84 and sewn to itself. One end of each strap 54 is looped though the ring 60 and sewn to itself and the other end is fed through the ring 58, looped through the connector 56, and fed back through the ring 58. For the sport-utility configuration, the straps 52 are looped through the rings 60 and attached to themselves. For the sedan configuration, the straps 52 are looped through the tabs 57 and connected to themselves.

In operation, the system 10 can be attached to either a sport-utility-type car seat or a sedan-type car seat.

Figure 4:
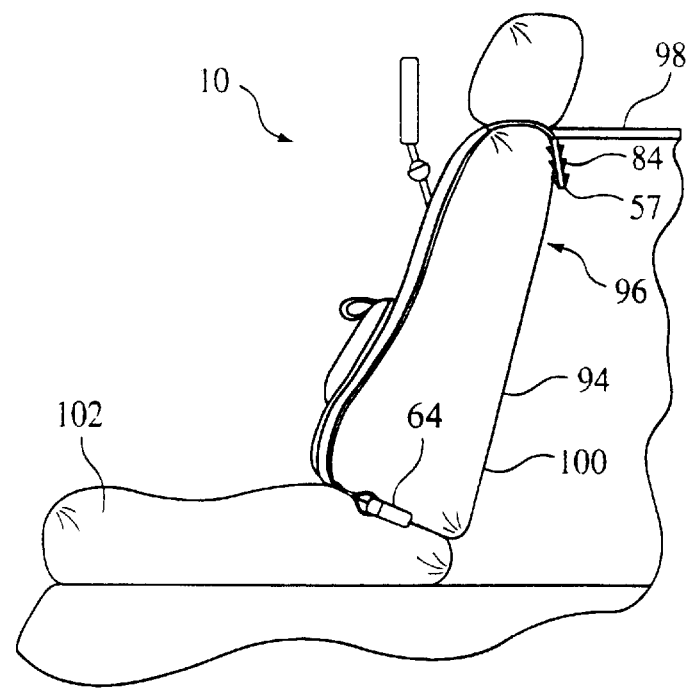
FIG. 4 is a side view of the assembly shown in FIG. 1 mounted to a se an-type rear car seat.

Referring to FIG. 4, to connect the system 10 to a sedan-type seat 94, the system 10 is assembled as described above with the tabs 57 connected to the straps 52. The system 10 is positioned as desired on the seat 94. The tabs 57 are inserted between a back surface 96 of the seat 94 and a ledge 98 adjacent to the seat 94 and extending backwards from the seat 94. The configuration and orientation of the ribs 84 (FIGS. 1 and 3) makes insertion of the tabs 57 relatively easy, and inhibits removal of the tabs 57. The female connectors 64 are inserted between a back rest portion 100 of the seat 94 and a bottom portion 102 of the seat 94. The connectors 64 also inhibit moving the system 10 from its desired position. Inserting the tabs 57 and connectors 64 in this way helps retain the system 10 in the desired position.

Figure 5:
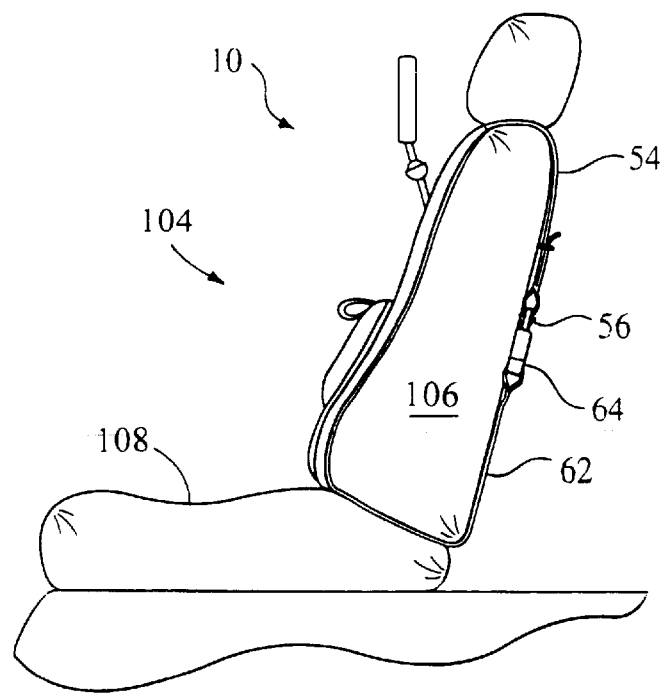
FIG. 5 is a side view of the assembly shown in FIG. 1 mounted to free-standing rear car seat.

Referring to FIG. 5, to connect the system 10 to a sport-utility-type seat 104, the system 10 is assembled as described above with the straps 54 looped through the rings 60. The body 12 is positioned as desired on the front of the seat 104. Corresponding male connectors 56 and female connectors 64 are mated adjacent the back of the seat 104, with the straps 54 wrapping over the top of a back rest portion 106 and down the back of the seat 104, and the straps 62 extending between the back rest portion 106 and a bottom portion 108 and up the back of the seat 104.

In either configuration, the mirror is adjusted to reflect light to and from desired directions. Referring to FIG. 1, the mirror housing 48 and mirror 50 are swiveled relative to the mirror support 46, e.g., in directions indicated by arrows 110, 112, and 114 to direct light to and reflect light from, e.g., directions indicated by arrows 116 and 118.

The mirror 50 and mirror housing 58 can be separated from the mirror support 46 by pulling the ball 76 from the recess 74. The remainder of the system 10, including the body 12, the mirror support 46, the strap assemblies 16 and 18, can be washed.

Other embodiments are within the scope of the appended claims.

What is claimed is:

1. A method of securing an object to a seat of a car, the method comprising placing the object on a back rest portion of the seat;

extending a strap assembly of the object across a top of the back rest portion of the seat; and inserting a tab of the strap assembly between a back surface of the seat and a rear ledge adjacent the seat, to secure the object to the seat, the tab comprising a plate that, as inserted, extends downward between the seat and ledge to below an upper surface of the ledge.

2. The method of claim 1 wherein the plate has top and bottom surfaces and a rib protruding from at least one of the surfaces.

3. The method of claim 2 wherein the rib is wedge-shaped, tapering from a relatively thick end to a relatively thin end away from the object.

4. The method of claim 2 wherein the tab has a plurality of ribs protruding from both of the top and bottom surfaces.

5. The method of claim 1 including extending two straps of the object across the top of the back rest portion of the seat, and inserting a tab of each strap between the back of the seat and the rear ledge.

6. The method of claim 1 wherein the strap assembly comprises a flexible strap and the tab disposed at a distal end of the strap, the tab defining a hole through which the strap extends.

7. The method of claim 6 wherein the strap is of adjustable length.

8. The method of claim 7 wherein the strap attaches to itself with mating hook and loop fasteners.

9. The method of claim 1 further comprising adjusting a length of the strap.

10. The method of claim 1 wherein the object further comprises a mirror.

11. The method of claim 10 wherein the mirror is positionable for viewing an infant in a rear-facing car seat.

12. The method of claim 1 wherein placing the object on a back rest portion of the seat comprises draping a flexible panel of the object over the back rest portion of the seat.

13. The method of claim 12 wherein the flexible panel defines pockets therein.

14. The method of claim 13 wherein the pockets are transparent.

15. The method of claim 12 wherein the flexible panel carries graphics for visual stimulation of a child in a rear-facing car seat.

16. The method of claim 12 wherein the flexible panel carries a mirror for viewing an infant in a rear-facing car seat.

17. The method of claim 15 wherein the mirror is pivotably mounted to the flexible panel.

18. A method of securing a mirror to a seat of a car, the method comprising placing the mirror on a back rest portion of the seat, extending a strap assembly of the mirror across a top of the back rest portion of the seat; and inserting a tab of the strap assembly between a back surface of the seat and a rear ledge adjacent the seat, to secure the mirror to the seat the tab comprising a plate that, as inserted, extends downward between the seat and ledge to below an upper surface of the ledge.

19. The method of claim 1 further comprising inserting a connector of the object between the back rest portion of the seat and a bottom portion of the seat.

* * * * *